(12) United States Patent
Chang et al.

(10) Patent No.: US 9,964,383 B2
(45) Date of Patent: *May 8, 2018

(54) TOY PROJECTILE AND METHOD OF MAKING

(71) Applicant: Mattel, Inc., El Segundo, CA (US)

(72) Inventors: Kin Fai Chang, Hong Kong (CN);
Chun Wing Wong, Hong Kong (CN);
Peter Kit Fan, Torrance, CA (US);
Him Fung Hau, Hong Kong (CN)

(73) Assignee: Mattel, Inc., El Segundo, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/007,759

(22) Filed: Jan. 27, 2016

(65) Prior Publication Data

US 2016/0282092 A1    Sep. 29, 2016

Related U.S. Application Data

(63) Continuation of application No. 13/838,900, filed on Mar. 15, 2013, now Pat. No. 9,261,336.

(51) Int. Cl.
| | |
|---|---|
| *A63B 65/02* | (2006.01) |
| *F42B 6/00* | (2006.01) |
| *B29C 69/02* | (2006.01) |
| *B29C 45/16* | (2006.01) |
| *B29C 47/00* | (2006.01) |

(Continued)

(52) U.S. Cl.
CPC ............ *F42B 6/003* (2013.01); *B29C 45/16* (2013.01); *B29C 47/0016* (2013.01); *B29C 47/0064* (2013.01); *B29C 47/0066* (2013.01); *B29C 65/18* (2013.01); *B29C 66/301* (2013.01); *B29C 69/02* (2013.01); *B29K 2025/08* (2013.01); *B29L 2031/529* (2013.01)

(58) Field of Classification Search
CPC .............. F42B 6/003; F42B 6/04; F42B 6/08
See application file for complete search history.

(56) References Cited

U.S. PATENT DOCUMENTS

| | | | | |
|---|---|---|---|---|
| 397,950 | A * | 2/1889 | White ...................... | F42B 6/08 |
| | | | | 248/205.5 |
| 1,918,718 | A * | 7/1933 | Samsel .................. | F42B 6/003 |
| | | | | 273/DIG. 25 |

(Continued)

FOREIGN PATENT DOCUMENTS

| | | |
|---|---|---|
| CN | 201138169 Y | 10/2008 |
| DE | 19519212 A1 | 11/1996 |

(Continued)

OTHER PUBLICATIONS

Abandoned Non-Published U.S. Appl. No. 13/720,834.

(Continued)

*Primary Examiner* — John Ricci
(74) *Attorney, Agent, or Firm* — Edell, Shapiro & Finnan, LLC (57) ABSTRACT

A toy projectile and method of making the toy projectile is provided herein. The toy projectile having: an elongated dart body secured to a tip assembly, the tip assembly comprising: a tip insert secured to a forward end of the elongated dart body and a tip secured to the tip insert, wherein the tip comprises a styrene ethylene butylene styrene copolymer (SEBS rubber) tip.

19 Claims, 6 Drawing Sheets

(51) Int. Cl.
  B29C 65/18 (2006.01)
  B29C 65/00 (2006.01)
  B29K 25/00 (2006.01)
  B29L 31/52 (2006.01)

(56) References Cited

U.S. PATENT DOCUMENTS

| | | | | |
|---|---|---|---|---|
| 2,119,524 A * | 6/1938 | Char | ............ | F42B 4/16 43/135 |
| 2,611,999 A * | 9/1952 | Mikolay | ............ | F42B 8/22 446/400 |
| 2,683,037 A * | 7/1954 | Ruczynski | ............ | F42B 6/003 42/99 |
| 2,807,469 A * | 9/1957 | Swartz | ............ | F42B 6/003 473/572 |
| 2,821,397 A * | 1/1958 | Hartigan, Sr. | ............ | F42B 6/00 124/62 |
| 2,828,966 A * | 4/1958 | Swartz | ............ | F42B 6/003 473/572 |
| 3,425,695 A * | 2/1969 | Kestenbaum | ............ | F42B 6/003 473/585 |
| 3,557,768 A * | 1/1971 | Lake | ............ | F41B 3/00 124/31 |
| 3,801,102 A | 4/1974 | Lohr et al. | | |
| 4,396,196 A * | 8/1983 | Drennan | ............ | F42B 6/08 473/585 |
| 5,373,833 A * | 12/1994 | D'Andrade | ............ | F41B 11/68 124/69 |
| 5,701,878 A * | 12/1997 | Moore | ............ | F41B 11/00 124/66 |
| 5,724,954 A * | 3/1998 | Smith | ............ | F41B 11/642 124/66 |
| 5,791,326 A * | 8/1998 | Brown | ............ | F41B 11/642 124/66 |
| 5,928,049 A * | 7/1999 | Hudson | ............ | A63H 27/004 446/15 |
| 5,944,006 A * | 8/1999 | Moore | ............ | F41B 11/642 124/65 |
| 6,083,127 A | 7/2000 | O'Shea | | |
| 6,159,117 A * | 12/2000 | Chan | ............ | F42B 6/003 446/34 |
| 7,364,521 B2 * | 4/2008 | Yang | ............ | A63B 65/02 248/206.2 |
| 7,604,556 B2 | 10/2009 | Witzigreuter | | |
| 7,775,918 B2 * | 8/2010 | Tsang | ............ | F42B 6/003 473/572 |
| 7,861,657 B2 | 1/2011 | Danon et al. | | |
| 8,012,049 B1 * | 9/2011 | Walterscheid | ............ | F42B 6/003 473/572 |
| 8,616,934 B1 | 12/2013 | Kern | | |
| D733,806 S | 7/2015 | Hedeen et al. | | |
| 9,261,336 B2 * | 2/2016 | Chang | ............ | F42B 6/003 |
| 2003/0153417 A1 | 8/2003 | Barrie et al. | | |
| 2006/0046877 A1 * | 3/2006 | Gajda | ............ | F42B 6/10 473/572 |
| 2009/0050010 A1 | 2/2009 | Tsang | | |
| 2015/0141181 A1 | 5/2015 | Chia | | |

FOREIGN PATENT DOCUMENTS

| | | |
|---|---|---|
| DE | 19745700 A1 | 4/1999 |
| FR | 2880944 A1 | 7/2006 |
| GB | 2072682 A | 10/1981 |
| JP | 50032238 A | 3/1975 |
| JP | 09-187571 A | 7/1997 |
| MX | 2003010235 A1 | 6/2005 |
| WO | 9420984 A1 | 9/1994 |
| WO | 2004088236 A1 | 10/2004 |
| WO | 2012/116193 A1 | 8/2012 |
| WO | 2012/155259 A1 | 11/2012 |

OTHER PUBLICATIONS

Oct. 12, 2016 Office Action on U.S. Appl. No. 14/776,427.
Pending Design U.S. Appl. No. 29/482,056.
Oct. 28, 2015 Office Action on Abandoned Non-Published U.S. Appl. No. 14/553,198.
May 30, 2014 Office Action on Abandoned Non-Published U.S. Appl. No. 13/720,834.
Abandoned Non-Published U.S. Appl. No. 14/553,198.
Abandoned Non-Published U.S. Appl. No. 15/056,038.
International Search Report for International Application No. PCT/US2014/028092; Date of Mailing: Jul. 16, 2014.
Written Opinion for International Application No. PCT/US2014/028092; Date of Mailing: Jul. 16, 2014.
Dec. 19, 2016 Chinese Office Action for Chinese Patent Application 201480028092.2 (with attached translation).

\* cited by examiner

TOY PROJECTILE AND METHOD OF MAKING

CROSS-REFERENCE TO RELATED APPLICATIONS

This application is a continuation of and claims priority to and the benefit of U.S. Non Provisional patent application Ser. No. 13/838,900, filed Mar. 15, 2013, entitled "TOY PROJECTILE AND METHOD OF MAKING" the entire disclosure of which is incorporated herein by reference in its entirety.

BACKGROUND

Various embodiments of the present invention relate to a toy projectile or dart and a method of making the toy projectile or dart.

Darts or toy projectiles have been used in toy guns or other toys to provide an enhanced play factor to the toy guns or toys. As with any toy projectile it is desirable to provide the same with a blunt soft end as well as certain characteristics that allow for durability and continued use.

Accordingly, it is desirable to provide a toy dart or toy projectile that is easy to manufacture and have robust characteristics as well as providing for the aforementioned safety factures.

SUMMARY OF THE INVENTION

In one embodiment, a toy projectile is provided, the toy projectile having: an elongated dart body secured to a tip assembly, the tip assembly comprising: a tip insert secured to a forward end of the elongated dart body and a tip secured to the tip insert, wherein the tip comprises a styrene ethylene butylene styrene copolymer (SEBS rubber) tip.

In another embodiment, a toy projectile is provided, the toy projectile having: an elongated dart body; a tip assembly, secured to the forward end of the elongated dart body, the tip assembly comprising: a tip insert and a tip portion insert molded thereto, the tip insert having a plurality of annular features extending from an exterior surface of the tip insert, wherein at least one of the plurality of annular features is covered by the tip portion when it is insert molded onto the tip insert and wherein at least one other of the plurality of annular features is only covered by a forward portion of the elongated dart body when it is secured to tip assembly.

In yet another embodiment, a method of securing a SEBS rubber tip to an extruded dart body is provided. The method including the steps of: forming a tip assembly by inserting a tip insert into a die of an injection molding machine, wherein the tip insert has a central opening extending therethrough and a plurality of features extending from an exterior surface of the tip insert; insert molding a SEBS rubber material wherein the die of the injection molding machine is configured to allow a portion of the SEBS rubber material to extend into a portion of the central opening and cover some of the plurality of features extending from the exterior surface of the tip insert; removing the tip assembly from the injection molding machine; and securing a forward end of an extruded dart body to at least one of the plurality of features of the tip insert that is not covered by the SEBS rubber material.

BRIEF DESCRIPTION OF THE DRAWINGS

These and/or other features, aspects, and advantages of the present invention will become better understood when the following detailed description is read with reference to the accompanying drawings in which like characters represent like parts throughout the drawings, wherein.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Referring now to the FIGS. and in particular FIGS. 1-5, a dart or projectile 10 constructed in accordance with an exemplary embodiment of the present invention is illustrated. Dart or projectile 10 has an elongated tubular body portion 12 which has a forward end or front end 14 and a rearward end 16. Rearward or rear end 16 has an opening 17 that extends into opening 19 of the elongated tubular body portion 12. Secured to the forward end 14 is a tip assembly 18. Tip assembly 18 has a tip portion 20 and a tip insert 22. The tip portion 20 is secured to a first portion of the tip insert 22 and a second portion of the tip insert is secured to the forward end 14 of the elongated tubular body portion 12.

Accordingly, tip insert 22 provides a means for securing the tip 20 to the forward end 14 of the elongated tubular body portion 12. In one exemplary embodiment, tip insert 22 is configured to have an inner opening 24 extending therethrough. In addition, an exterior surface 26 of the tip insert 22 is configured to have a plurality of features or annular rings 28 extending away from the exterior surface 26 of the tip insert 22. In one embodiment, the plurality of features or annular rings 28 provide securement features to which the tip 20 and the forward end 14 are secured thereto. Still further, the plurality of features or annular rings also provide a plurality of grooves 30 located between the annular rings. The features or annular rings 28 as well as the grooves 30 located therebetween provide a mechanism for rigidly securing the forward end 14 to the tip assembly 18. In one implementation and as the material of forward end 14 is pushed between annular rings 28 and then cooled, an interlock of the tip assembly 18 and the tubular body portion 12 is formed.

Figure 6:
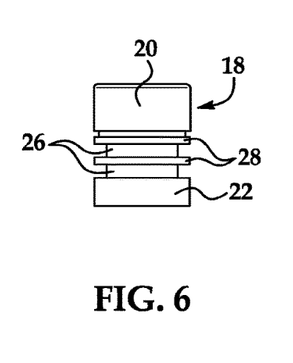
FIG. 6 is a view of a tip assembly constructed in accordance with one non-limiting exemplary embodiment of the present invention.
Figure 7:
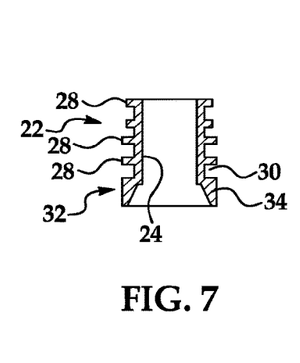
FIG. 7 is a cross-sectional view of an insert constructed in accordance with one non-limiting exemplary embodiment of the present invention.
Figure 8:
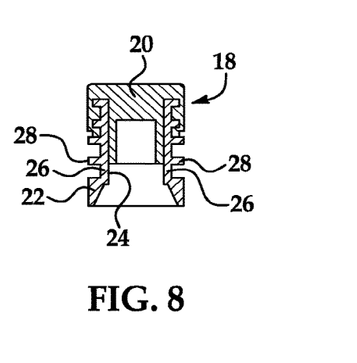
FIG. 8 is a cross-sectional view a tip assembly constructed in accordance with one non-limiting exemplary embodiment of the present invention.

FIG. 6 illustrates a tip assembly 18 formed in accordance with one non-limiting exemplary embodiment of the present invention. FIG. 7 is a cross-sectional view of the tip insert 22 formed in accordance with one non-limiting exemplary embodiment of the present invention while FIG. 8 is a cross-sectional view of the tip insert 22 with the tip 20 secured thereto. As illustrated, the plurality of features or annular rings 28 provide securement features to which the tip 20 and the forward end 14 are secured thereto. Still further, the plurality of features or annular rings 28 also provide a plurality of grooves 30 located between the annular rings. In accordance with one embodiment, the height or distance of the annular rings 28 may vary. In addition, a rearward end 32 of the tip insert 22 maybe formed with a flange portion 34 which provides additional rigidity to the tip insert and/or tip assembly and in particular to the area that is secured to the forward end 14 of the elongated dart body 12.

In accordance with one non-limiting exemplary embodiment, the tip insert 22 is formed from the following material TPR Thermoflex ME1385 via an injection molding process. Of course, other equivalent materials for forming the tip insert are considered to be within the scope of exemplary embodiments of the present invention. In one non-limiting exemplary embodiment, the core part or tip insert 22, was shot at a temp of 225° C. and the shot pressure was 65 bar for a cycle time of 40 seconds. Of course, other temperatures, times and pressures greater and less than the aforementioned values are considered to be within the scope of various embodiments of the present invention.

In accordance with one non-limiting exemplary embodiment, the tip 20 is formed from a styrene ethylene butylene styrene copolymer (SEBS rubber) or more particularly the following material TPR Thermoflex ME1927 via an injection molding process. Of course, other equivalent materials for forming the tip are considered to be within the scope of exemplary embodiments of the present invention. In one non-limiting exemplary embodiment, the tip part was shot at a temp of 225° C. and the shot pressure was 50 bar for a cycle time of 60 seconds. Of course, other temperatures, times and pressures greater and less than the aforementioned values are considered to be within the scope of various embodiments of the present invention.

In accordance with one non-limiting exemplary embodiment, the elongated tubular body portion 12 is formed from an extrusion process wherein the tubular body portion is formed from a polyethylene which in one embodiment comprises 60% LDPE and 40% HDPE. Of course, other equivalent materials and combinations thereof are considered to be within the scope of exemplary embodiments of the present invention.

Figure 9:
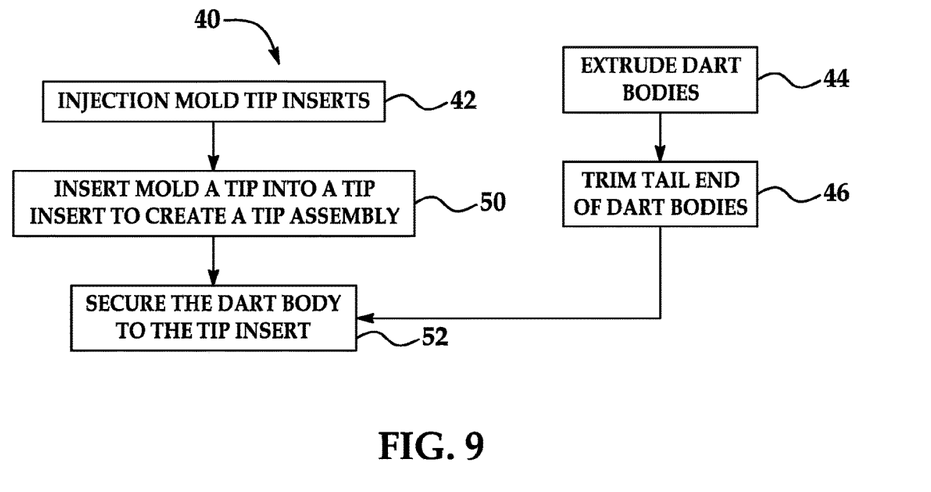
FIG. 9 is a flowchart illustrating a method or process for forming a dart or projectile in accordance with one non-limiting exemplary embodiment of the present invention.

Referring now to FIG. 9 a flowchart 40 illustrating one non-limiting method for forming the dart or projectiles 10 is provided. At box 42 at least one or a plurality of tip inserts 22 are formed by the aforementioned injection molding process. Simultaneously, previously or afterwards at least one or a plurality of elongated tubular dart body portion 12 are formed by an extrusion process at step 44. During this step or process the tubular body portion 12 is formed from an extrusion machine wherein an elongated member is extruded from the aforementioned materials and once cooled, the extruded member is cut into the desired lengths for use as tubular body portion 12.

Figure 1:
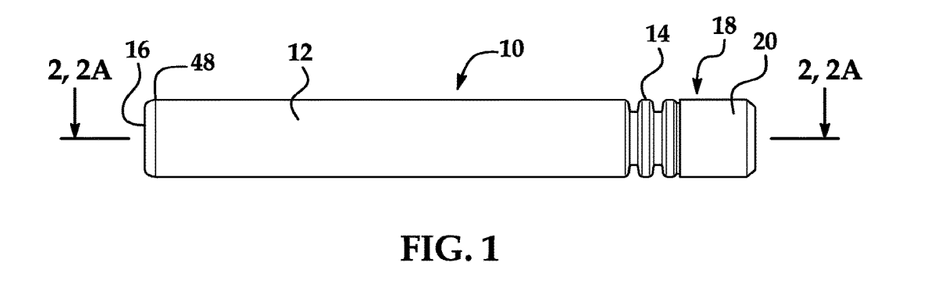
FIG. 1 is a view of a dart or projectile in accordance with an exemplary embodiment of the present invention.
Figure 2:
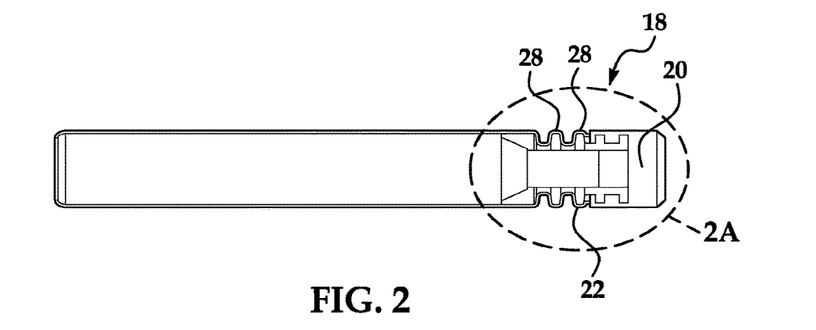
FIG. 2 is a cross-sectional view of the dart or projectile along the lines 2-2 of FIG. 1.
Figure 2A:
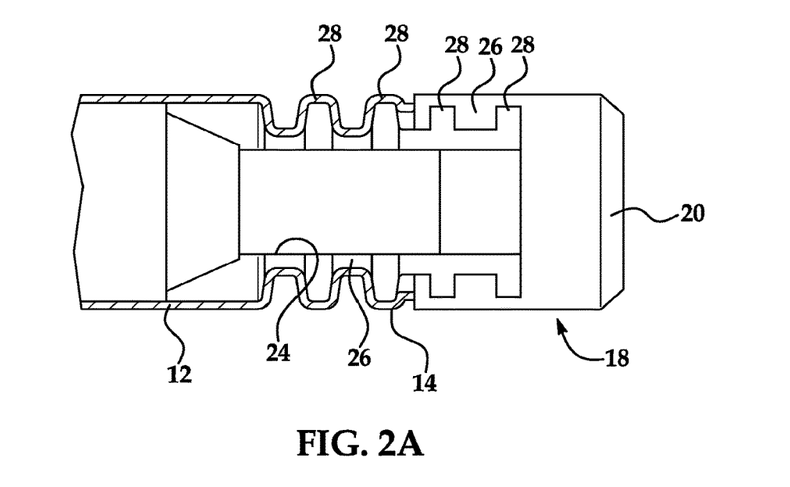
FIG. 2A is an enlarged portion of FIG. 2.
Figure 2B:
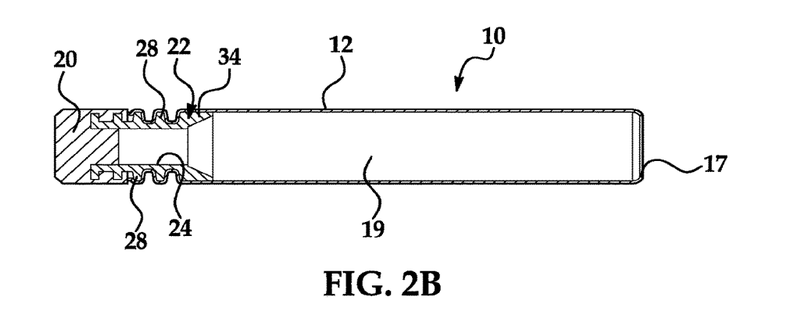
FIG. 2B is a cross-sectional view of the dart or projectile along the lines 2-2A of FIG. 1.
Figure 3A:
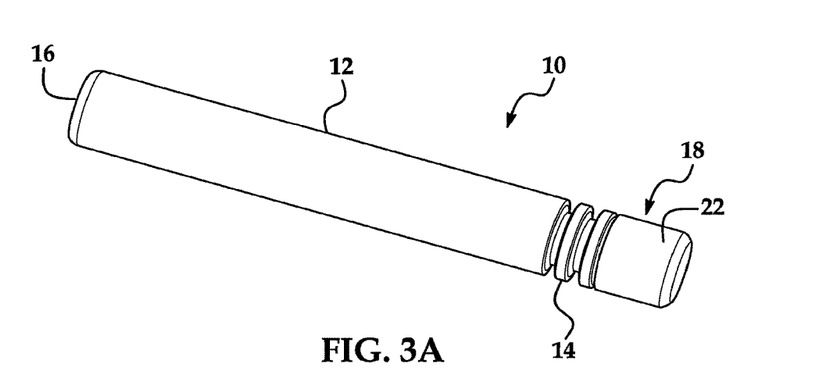
FIGS. 3A and 3B are front and rear perspective views of the dart or projectile illustrated in FIG. 1 in accordance with an exemplary embodiment of the present invention.
Figure 3B:
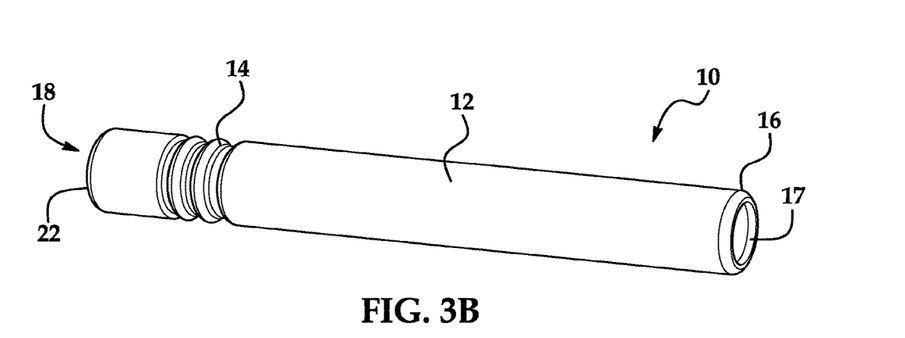
Figure 4:
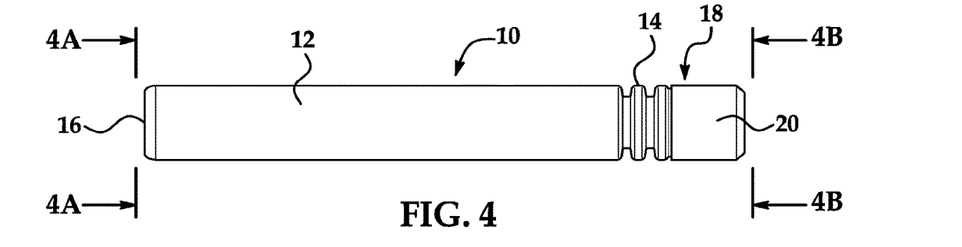
FIGS. 4 and 5 are side views of the dart or projectile in accordance with an exemplary embodiment of the present invention.
Figure 4A:
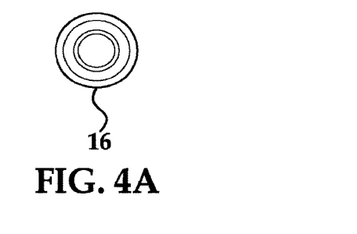
FIG. 4A is a view along lines 4A-4A of FIG. 4 or a rear view of the dart or projectile of FIG. 1 in accordance with an exemplary embodiment of the present invention.
Figure 4B:
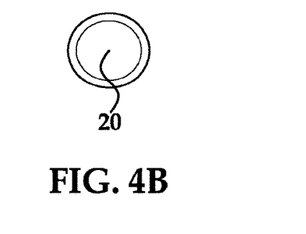
FIG. 4B is a view along lines 4B-4B of FIG. 4 or a front view of the dart or projectile of FIG. 1 in accordance with an exemplary embodiment of the present invention.
Figure 5:
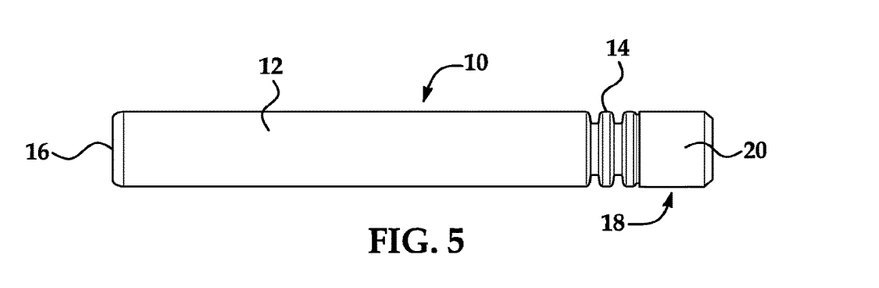

At step 46, the rear end or tail end 16 of the elongated tubular dart body portion proximate to opening 17 is trimmed to have a curved or rounded surface 48 (see at least FIG. 1). Once trimmed, the elongated tubular body portion 12 is ready to be secured to the tip assembly 18. In an alternative embodiment step 46 may be eliminated.

At a step 50, the molded tip insert 22 is inserted into an injection molding machine wherein the tip portion 20 is insert molded onto a portion of the tip insert 22 as described above and illustrated in the attached FIGS. Once this process is complete, the tip assembly 18 is now formed.

After conclusion of the process at step 50, the form tip assemblies 18 are now secured to the elongated body portions 12 via a heat treating process which occurs at step 52.

Figure 10:
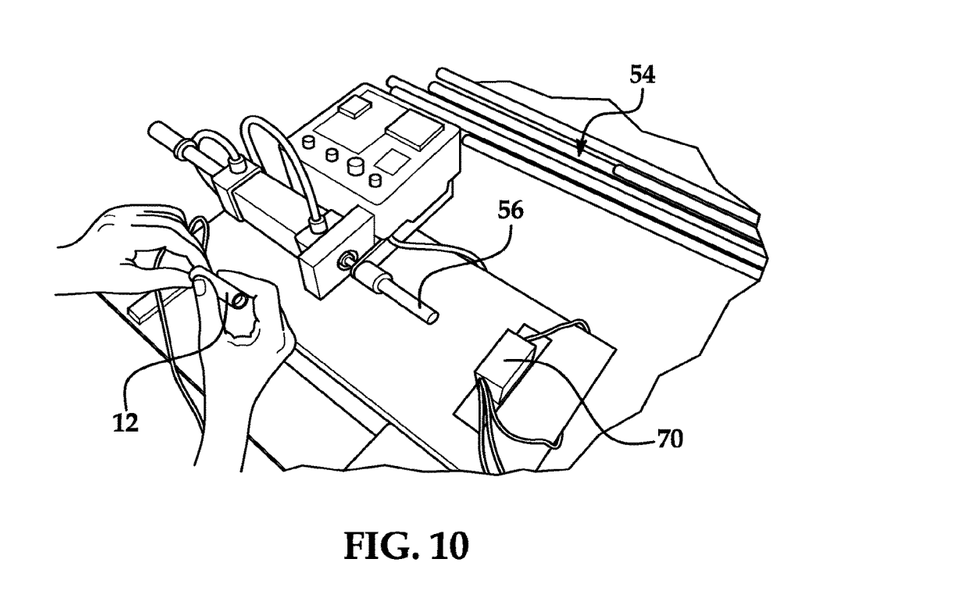
FIGS. 10 and 11 illustrating an apparatus for trimming a tail or rearward end of the dart or projectile.
Figure 11:
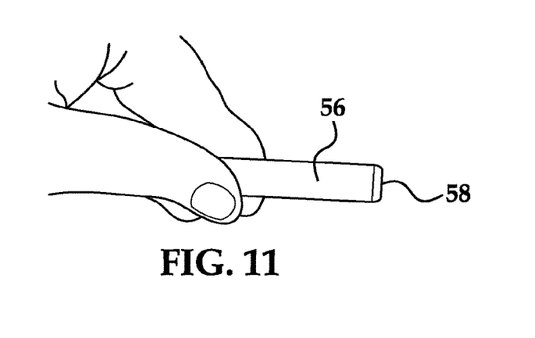

Referring now to FIGS. 10 and 11, an apparatus 54 for use in the trimming step 46 is illustrated. Apparatus 54 has a plunger 56 onto which the extruded elongated body 12 is placed and an end portion 58 of plunger 56 has corresponding rounded ends which form the rounded ends or end 48 of the elongated body portion 12 when plunger 56 is moved towards a copper plate or other of material 70 which is heated in order to manipulate or trim the extruded elongated body 12 to have a trimmed end or rounded surface 48.

Figure 12:
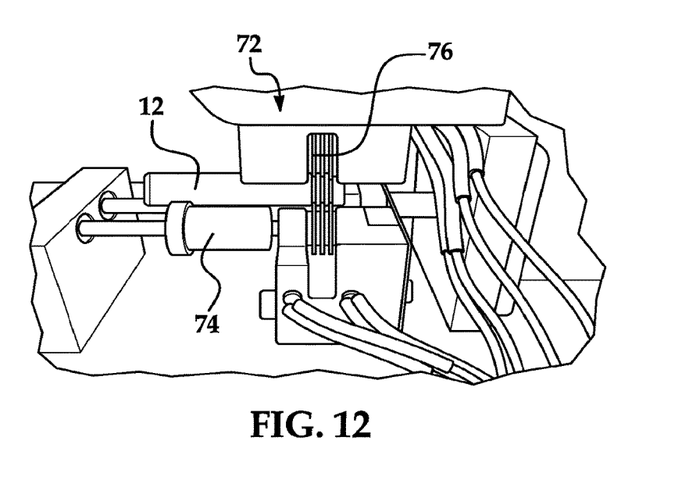
FIG. 12 illustrates an apparatus for securing an extruded dart body to a tip assembly.

FIG. 12 illustrates an apparatus 72 for use in step 52 wherein the elongated body 12 with the tip insert inserted into a forward end 14 of the elongated body 12 is placed between a pair of rollers 74 which rotate the same. A heated copper roller assembly or other equivalent material 76 applies heat and pressure to the forward end 14 of the elongated body such that portions of the same are now pushed into the grooves 30 of tip insert 22 so that the elongated body 12 is now secured to the tip assembly 18 and the dart or projectile 10 is formed.

Figure 13:
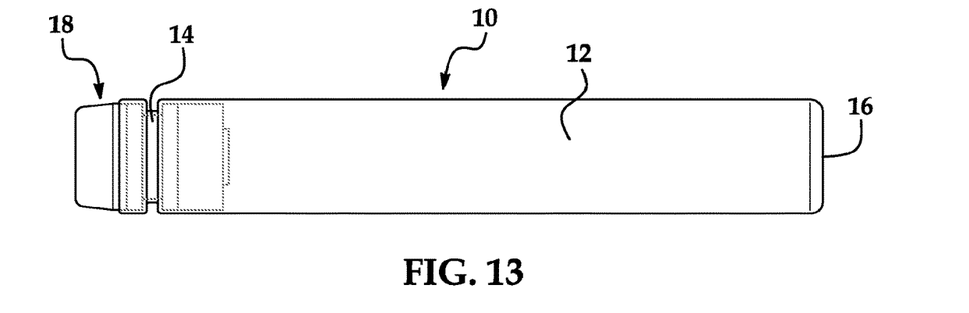
FIG. 13 illustrates a dart or projectile formed in accordance with an alternative exemplary embodiment of the present invention.
Figure 13A:
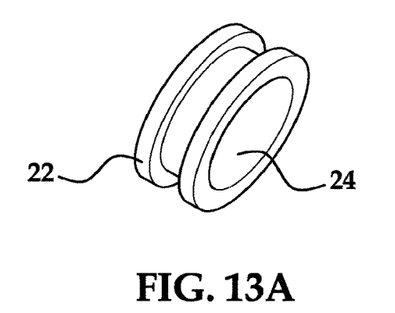
FIGS. 13A-13D portions of the dart or projectile illustrated in FIG. 13.
Figure 13B:
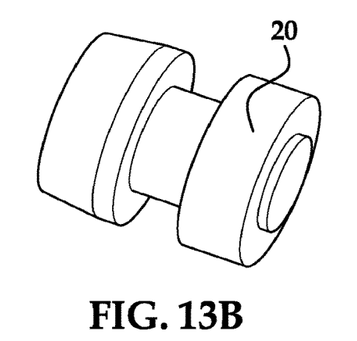
Figure 13C:
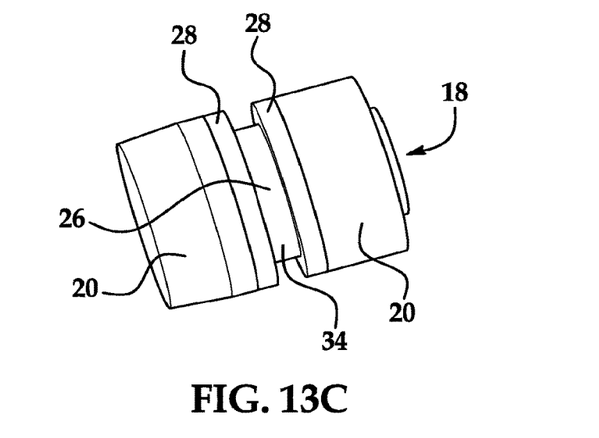
Figure 13D:
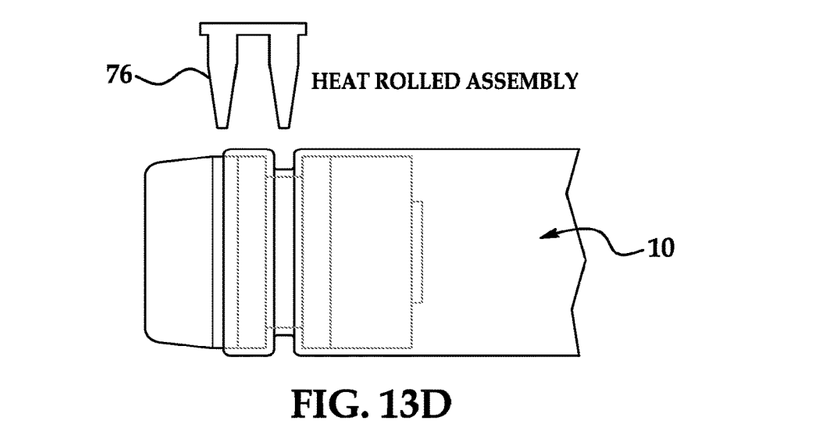

Referring now to the FIGS. 13-13D an alternative exemplary embodiment of the present invention is illustrated. Here the tip insert 22 and the tip portion 20 have alternative configurations. In this embodiment, after the insert molding process the tip 20 or material used to form tip 20 extends completely through the central opening 24 of the tip insert 22 and is received within the central opening of the elongated tubular body 12. In addition and in this embodiment, the forward end 14 of the elongated body 12 is formed onto features 28 and groove 30 as well as a portion of tip portion 20. Of course, numerous other configurations are considered to be within the scope of exemplary embodiments of the present invention and the above embodiments are merely examples of various embodiments of the present invention.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A toy projectile, comprising:
an elongated dart body secured to a tip assembly, the tip assembly comprising: a tip insert secured to a forward end of the elongated dart body, the tip insert including a distal end and a longitudinal outer surface, the tip having a plurality of features extending from the longitudinal outer surface, and a tip secured to the tip insert, wherein the tip comprises a styrene ethylene butylene styrene copolymer tip and wherein the tip is insert molded onto the distal end and at least a portion of the longitudinal outer surface of the tip insert, and the forward end of the elongated dart body is thermoformed to at least one of the plurality of features of the tip.

2. The toy projectile as in claim 1, wherein tip insert has a central opening extending therethrough.

3. The toy projectile as in claim 2, wherein tip is insert molded onto the tip insert and portions of the tip extend into the central opening and cover some of the plurality of features extending from the longitudinal outer surface.

4. The toy projectile as in claim 3, wherein the at least one of the plurality of features to which the elongated dart body is thermoformed is not covered by a portion of the tip.

5. The toy projectile as in claim 4, wherein the elongated dart body has a rearward end opposite the forward end and the rearward end is configured to have a rounded exterior surface.

6. The toy projectile as in claim 5, wherein the elongated dart body has a central opening extending therethrough.

7. The toy projectile as in claim 6, wherein the central opening of the elongated dart body is in fluid communication with a portion of the central opening of the tip insert that is not filled with a portion of the tip.

8. The toy projectile as in claim 1, wherein the elongated dart body has a rearward end opposite the forward end and the rearward end is configured to have a rounded exterior surface.

9. A toy projectile, comprising:
an elongated dart body secured to a tip assembly, the tip assembly comprising: a tip insert, including a distal end and a longitudinal outer surface, secured to a forward end of the elongated dart body and a tip secured to the tip insert, wherein the tip comprises a styrene ethylene butylene styrene copolymer tip formed on the distal end and covering at least a portion of the longitudinal outer surface of the tip insert, the tip insert has a plurality of features extending from the longitudinal outer surface, and the styrene ethylene butylene styrene copolymer tip is formed onto the tip insert and covers some of the plurality of features extending from the longitudinal outer surface.

10. The toy projectile as in claim 9, wherein tip insert has a central opening extending therethrough.

11. The toy projectile as in claim 10, wherein portions of the tip extend into the central opening of the tip insert.

12. The toy projectile as in claim 11, wherein the forward end of the elongated dart body is thermoformed into a groove located between at least two of the plurality of features extending from the longitudinal outer surface of the tip assembly that are not covered by a portion of the tip.

13. The toy projectile as in claim 11, wherein the elongated dart body includes a central opening in fluid communication with a portion of the central opening of the tip insert that is not filled with a portion of the tip.

14. The toy projectile as in claim 9, wherein the styrene ethylene butylene styrene copolymer tip is formed on the distal end and covering at least a portion of the longitudinal outer surface of the tip insert via insert molding.

15. The toy projectile as in claim 9, wherein the elongated dart body has a rearward end opposite the forward end and the rearward end of the elongated dart body is configured to have a rounded exterior surface.

16. A toy projectile, comprising:
an elongated dart body secured to a tip assembly, the tip assembly comprising: a tip insert secured to a forward end of the elongated dart body, the tip insert including a distal end and a longitudinal outer surface, the tip insert including a plurality of features extending from the longitudinal outer surface, and a tip secured to the tip insert, wherein the tip is formed onto the distal end and covering some of the plurality of features extending from the longitudinal outer surface of the tip insert, and the forward end of the elongated dart body is thermoformed into a groove located between at least two of the plurality of features extending from the longitudinal outer surface of the tip assembly.

17. The toy projectile as in claim 16, wherein the tip is a styrene ethylene butylene styrene copolymer tip that is formed on the distal end and covering some of the plurality of features extending from the longitudinal outer surface of the tip insert.

18. The toy projectile as in claim 17, wherein the styrene ethylene butylene styrene copolymer tip is formed on the distal end and covering some of the plurality of features extending from the longitudinal outer surface of the tip insert via insert molding.

19. The toy projectile as in claim 16, wherein the at least two of the plurality of features extending from the longitudinal outer surface of the tip assembly are not covered by a portion of the tip.

* * * * *